July 9, 1929.　　　　R. COMBEST　　　　1,720,468
ROTARY FRUIT AND VEGETABLE STEMMING, PEELING, AND TRIMMING HEAD
Filed Aug. 27, 1928
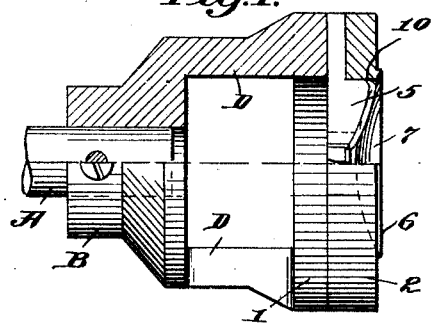
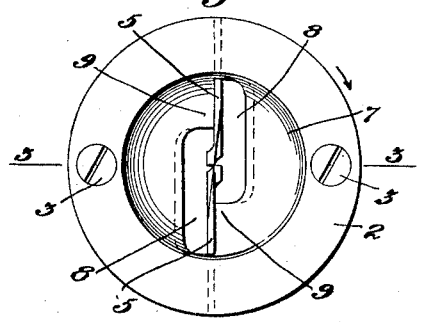
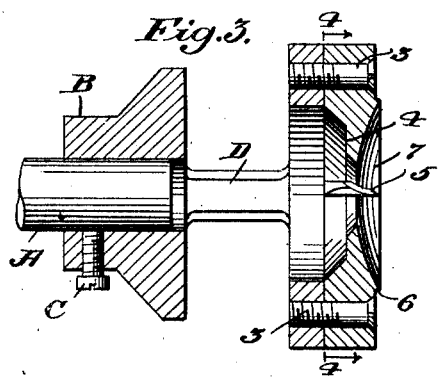
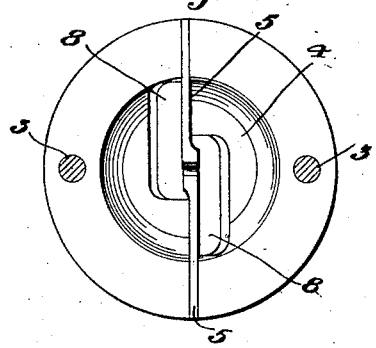
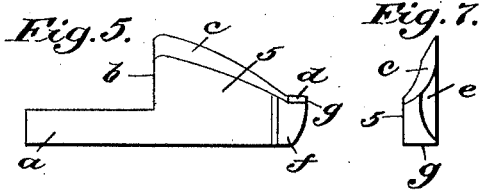
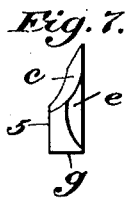
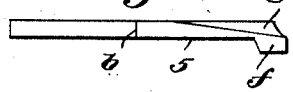
Inventor:
Ross Combest,
by Richard E. Babcock
Att'y.

Patented July 9, 1929.

1,720,468

UNITED STATES PATENT OFFICE.

ROSS COMBEST, OF BEAUMONT, TEXAS.

ROTARY FRUIT AND VEGETABLE STEMMING, PEELING, AND TRIMMING HEAD.

Application filed August 27, 1928. Serial No. 302,294.

This invention relates to rotary cutter heads for fruit and vegetable toppers, trimmers and peelers, such as fig stemmers and peelers, beet toppers, artichoke trimmers, celery trimmers, etc., and has more particularly in view for the embodiment illustrated and described the fig dressing field.

The primary objects of the present invention are, to provide a simple cutter head which may be quickly taken apart to give complete access to the entire surface of each part for cleaning; to provide a simple combination of parts positively maintaining the knives in proper relation; to provide a two-blade cutting head wherein the cutting edges of said knives meet end to end and extend as a single composite cutting edge across the mouth or bowl of the head and in which the knives are exact duplicates of each other and are interchangeable; to provide a cutter head wherein the knives are imperforate throughout and are held in proper position by the other parts of the head without employing any individual special means for holding or securing the knives in place; to insure the proper assembly of the knives with respect to each other and to the other elements of the cutter head by even the most inexperienced operative; to provide in a cutter head a removable or separable front plate or knife holder in combination with a pair of removable knives which may be removed simply by lifting out and replaced, or substituted by a new knife or knives simply by being dropped into the holder; to provide a novel and very efficient sturdy knife blade for such heads; to provide a cutter head with a large throat so formed as to effectually support and brace the knives while preventing clogging and giving the maximum degree of access to the parts as assembled; and to promote economy of manufacture, both as to the manufacture of the various parts, and as to the assembly of the parts into an operative unit.

In this application I show and describe only the preferred embodiment of my invention simply by way of illustration of the practice of my invention as by law required. However, I recognize that my invention is capable of other and different embodiments, and that its various details may be modified in various ways, all without departing from my said invention; therefore, the drawing and description herein are to be considered as merely illustrative and not as exclusive.

In the accompanying drawings which are to scale from an actual commercial embodiment, the first four figures being actual full scale, and the last three figures being twice actual dimensions:

Figure 1 represents a view of a cutter head embodying my invention, partly in side elevation and partly in longitudinal vertical section;

Figure 2, a front elevation of the embodiment illustrated in Fig. 1;

Figure 3, a sectional view on line 3—3 of Fig. 2;

Figure 4, a sectional view on line 4—4 of Fig. 3;

Figure 5, an enlarged detail side elevation of one of the knives, said knives being exact duplicates in all respects;

Figure 6, a front plan view of said knife on the same scale as Fig. 5; and

Figure 7, an inner end elevation of said knife on the same scale as Figs. 5 and 6.

Referring now in detail to the drawings, A designates a rotary shaft on which the hub B is adapted to be mounted to turn therewith in any suitable manner, as for instance by means of a friction screw C, said hub B being connected to a supporting ring 1 by means of two diametrically opposite posts or bars D, said hub B, posts or bars D and ring 1 preferably being integral and said ring 1 being so positioned well in advance of hub B to permit a free unobstructed discharge of the stems and peelings and to permit full access to the operative parts as assembled.

The ring member 1 has a smooth flat plane front face to form a backing and support for the separable front plate or knife member 2, and the knives carried thereby, said members 1 and 2 being axially bored in registry at two diametrically opposite points, in the embodiment illustrated, the bores in the member 1 being internally screw-threaded, and cooperating screws 3 fitting in said bores and engaging in the screw-threads in the bores in member 1, and having their heads countersunk in, or flush with, the front of member 2, serve to hold said members 1 and 2 tightly together and to clamp the knives 5 tightly between them in the slots in member 2 and in proper relation to each other and to said members 1 and 2.

The removable front plate or knife holder member 2 is centrally recessed as at 4 in its rear face, the circumferential wall of said recess flaring rearwardly to the rear face of said member 2, at which point the diameter of said recess is equal to the inner diameter of the ring member 1, so that the inner faces of said ring member 1 and the wall of said recess 4 make a smooth joint.

At opposite points, and on opposite sides of a straight central line intersecting the axis of said member 2, the rear portion of said member 2 is slotted to preferably the same depth as the depth of recess 4 to receive respectively the shanks $a$ of the knives 5, said slots and said shanks $a$ preferably being of the same cross-sectional shape and of such relative size in cross section that the said shanks will make a snug tight fit in said slots, respectively, with their rear edge faces flush with the rear face of member 2, or extending very slightly, say one thousandth of an inch, or slightly over, relatively speaking, to the rear of the rear face of member 2, so that said shanks $a$ will be clamped and held between the members 1 and 2 when they are drawn tightly together.

The front portion of the plate or member 2 is formed with a slight concentric shoulder or boss 6 so as to extend forward slightly beyond the heads of screws 3, said boss being spherically recessed as at 7, preferably on a radius of one and seven-sixteenth inches, in its front face on a regular arc, the edge of which is coincident at all points with the annular edge of said boss 6, and the material between the recesses 4 and 7 is cut out on opposite sides of the above mentioned straight central line to form two elongated overlapping U-shaped openings 8. The opposed bottom walls of said openings 8 are beveled to flare radially outward toward hub B to facilitate the discharge of stems and peelings, their radial faces, opposed to said beveled edges, are coincident with said central line, extend truly axially parallel to the axis of said member 2, and constitute shoulders 9 respectively in alignment with and constituting continuations of the adjacent axially disposed radial walls of said slots respectively, said shoulders 9 serving as bracing or supporting shoulders for the respective knives 5, preventing yielding or bending of said blades or knives 5 during operation of the cutter head. The portions 10 of the radially outer end walls of said openings 8, where they intersect the respective shank slots, are preferably straight in all directions.

Each knife 5 is formed with a long reduced shank $a$ fitting in its respective slot in the member 2 and extending from the radially outer end of said knife, considered as a whole, to the axially forwardly extending shoulder $b$, which fits against portion 10 of the radially outer end wall of its respective opening 8, the adjacent portion of the back of the knife being in contact with and bearing against the radial edge of its cooperating bracing or supporting shoulder 9. the distance from said shoulder $b$ to the radially outer end of the shank $a$ preferably being the same as the length of its respective slot in member 2.

The portion of said knife 5 between said shoulder $b$ and the front tip of its radially inner end is equal to one half of the distance between the opposing portions 10 of the radially outer end walls of openings 8, and has its front portion inward from shoulder $b$ beveled abruptly as at $c$ and $d$ to form a cutting edge and reversely beveled very gradually and more deeply on its reverse side, starting at its radially inner end and gradually tapering off for about two-thirds of the length of the cutting portion of said knife 5 to give a cutting edge with a straight outer portion and a longer gradually curving portion, the inner end of which merges with the central line mentioned at the axis of member 2, and to permit this formation of the cutting edge, which involves beveling on both sides of the knife at its radially inner end, said radially inner end is built up or formed with an additional thickness as at $f$.

In outline, the cutting edge of each knife 5 as mounted in member 2, extends on a long gradual convex curve starting at the shoulder $b$, its most forward point, to a point near the inner end of the knife, constituting a curved peeling edge portion, from which extends the stem cutting edge portion $d$ all lying in the same radial plane extending at right angles to the axis of the member 2, said edge portions $d$ of the knives 5 together with the adjacent portions of their curved edge portions $c$ lying to the rear of an arcuate line coincident with the arcuate face of recess 7 and, in the embodiment illustrated, slightly in front of the recess 4.

The radially inner ends $g$ of the knives 5 will preferably curve rearwardly radially outward away from each other to provide for greater ease of access and prevent clogging, only the extreme forward portion of the inner ends of said knives 5, as mounted in the cutter head, being in contact.

The knives 5 are formed exactly alike, being of the same size, shape and construction so as to be interchangeable with each other to the fullest extent, and, therefore, when the pair of knives 5 are mounted in the member 2 with their shanks received in their respective slots therein, their cutting edges will for the most part lie on opposite sides of the above mentioned central line, gradually converging radially inward toward each other until they merge with each other and with said central line at the intersection thereof with the axis of said member 2, and this is inherent to my invention whether the knives 5 be taken out and reversed with relation to each other or whether one or both of said knives be replaced by a new knife or knives 5.

While in the embodiment illustrated the member 2 is slotted to receive the shanks *a* of knives 5 and ring 1 is not slotted, this is not of particular importance, nor is it essential to employ such a heavy thick member 2, nor to recess the back thereof particularly if a thinner member 2 be employed; nor is it important that the members 1 and 2 be secured together by threaded means such as screws 3, but any suitable known means or method serving to perform this function and permitting their easy separation will answer equally well; nor is the particular construction of the hub B with its integral posts or bars D and integral ring supporting member 1 of any real moment, it being merely essential that there shall be some means for mounting the member 2 for rotation, said means being adapted for mounting on a rotary shaft, and some way of maintaining the knives in proper operative relation to each other and said member 2.

Any suitable material may be used for any part, and, in the embodiment illustrated, the direction of rotation will be as indicated by the arrow in Fig. 2.

Briefly, to assemble the parts of the embodiment herein illustrated and described, the knives 5 will be arranged with their cutting edges presented toward the front so as to project forwardly in recess 7, with their shoulders *b* in engagement with the portions 10 of the respective radially outer end walls of openings 8, with their shanks *a* snugly received in their respective slots and with their radially inner ends *g* in engagement, when the member 2 will be fitted against supporting ring member 1 and secured thereto by screws 3, said members 1 and 2 serving to prevent relative axial and peripheral movement of the knives 5, the shoulders 9 serving to prevent possible bending or deflection in use of the knives 5, and the portions 10 preventing radially outward movement of the knives 5, while their end to end engagement prevents their radially inward movement.

In using the present embodiment in connection with figs preferably only the stem and thick skin adjacent thereto will be removed with the peeling head, this being the only part of figs that it is necessary to dress in preparation for preserving, as the skin of the other portions of figs is easily removed by treatment with a suitable solution according to well known practice.

The cutting profile of the knives 5, that is the long convex curve portion *c* with its radially outer end in advance of its radially inner end, with the portion *d* extending from the radially inner end thereof and lying all in a single radial plane at right angles to the axis of the member 2, was designed of course particularly for use in dressing figs and where the cutter head is to be employed with different fruits and vegetables knives having a different profile suitable to the article to be dressed, but otherwise in all respects the same as the knives 5 illustrated and described herein may be substituted in the member 2.

What I claim is:

1. A rotary fruit and vegetable stemming, peeling and trimming head comprising a rotary supporting member, a removable head member, and means for securing said members together against relative movement, in combination with radially extending knives confined by said members against relative axial, peripheral, and radially outward, movement and cooperating with each other to prevent their relative radially inward movement.

2. A rotary fruit and vegetable stemming, peeling and trimming head comprising a removable front head member, in combination with a pair of diametrically opposite radially disposed blades mounted in said member, and means preventing axial movement of said blades relative to said member, said blades each being formed with a radially outwardly presented shoulder in assembled relation contacting with said member and preventing its relative radially outward movement, and said blades in assembled relation having their radially inner ends in contact preventing relative radially inward movement thereof.

3. A rotary fruit and vegetable stemming, peeling and trimming head comprising a supporting member, a removable front plate member formed in its rear face with radially disposed substantially diametrically opposite slots disposed on opposite sides of a straight line intersecting its axis, and means for securing said members together to rotate as one and in contact with each other against axial movement relative to each other, in combination with a pair of radially disposed blades having portions snugly fitting in said slots respectively with their rear edge faces substantially flush with the rear face of the removable plate member and clamped between said members.

4. A rotary fruit and vegetable stemming, peeling and trimming head comprising a supporting member, and a removable front plate member formed in its rear face with radially disposed substantially diametrically opposite slots disposed on opposite sides of a straight line intersecting its axis, said slots being of angular shape in cross-section, in combination with a pair of radially disposed blades having portions corresponding in cross-section shape and size to said slots and snugly fitting in said slots respectively, and means for drawing and holding said members tightly together to clamp and firmly hold said knives between said elements and to prevent relative movement between said members and between said knives and members.

5. A rotary fruit and vegetable stemming, peeling and trimming head comprising a supporting member, and a removable front plate member, one of the opposed portions of said members being formed with radially disposed substantially diametrically opposite slots, in combination with a pair of radially disposed blades having shanks respectively corresponding in cross-sectional shape to the cross-sectional shape of said slots and making a snug fit therein, and means for drawing and holding said members tightly together to turn as one and tightly clamp and hold the shanks of said knives between them against all movement relative to said members.

6. A rotary fruit and vegetable stemming, peeling and trimming head comprising a rotary supporting member, a removable member, and means for securing said members together against relative movement, in combination with radially extending knives confined by said members against relative axial, peripheral, and radially outward, movement with relation to each other and to said members.

7. A rotary fruit and vegetable stemming, peeling and trimming head comprising a rotary supporting member, a removable member, and means for securing said members together against relative movement, in combination with a pair of radially extending knives received in one of said members, said members holding said knives against relative axial and peripheral movement and preventing their turning about their longitudinal central lines, the respective knives having portions engaging with one of said members preventing the relative radial outward movement of said knives, and said knives having their radially inner ends in abutment preventing their relative radially inward movement.

8. A rotary fruit and vegetable stemming, peeling and trimming head comprising a pair of knives, in combination with means for mounting and holding said knives radially disposed diametrically opposite each other with their radially inner ends in contact, said knives being disposed on opposite sides of a straight line intersecting the axis of the head with a face coincident therewith and each provided with a thickened radially inner end portion extending across said line, and formed with a cutting edge extending on a gentle curve from the axis of said head radially outward for the greater portion of the length of said edge, the said blades being in all respects exact duplicates of each other and interchangeable, whereby their cutting edges will be in exact alignment at their inner ends and in contact.

In testimony whereof, I have signed my name to this specification at Beaumont, Texas, this 24th day of August, 1928.

ROSS COMBEST.